United States Patent [19]

Steibel

[11] Patent Number: 4,560,389
[45] Date of Patent: Dec. 24, 1985

[54] COMBUSTIBLE NEWSPAPER LOG

[76] Inventor: James P. Steibel, 4822 - 57th Dr., Sturtevant, Wis. 53177

[21] Appl. No.: 706,763

[22] Filed: Feb. 28, 1985

[51] Int. Cl.$^4$ ............................................. C10L 5/36
[52] U.S. Cl. ...................................... 44/1 R; 44/14; 44/38; D23/138.2; D23/138.4; D23/138.5; D23/166
[58] Field of Search .............................. 44/1, 14, 38; D23/138.4, 138.5, 166, 138.2

[56] References Cited

U.S. PATENT DOCUMENTS

| 28,753 | 6/1860 | Hobe | 100/3 |
| 199,394 | 1/1878 | Aldrich | 100/94 |
| 3,186,333 | 6/1965 | Hoffman et al. | 100/9 |

OTHER PUBLICATIONS

Miles Kimball Catalog; Fall, 1983, p. 125, Item No. 8928 and Item No. 8843.

Primary Examiner—Curtis R. Davis
Attorney, Agent, or Firm—Arthur J. Hansmann

[57] ABSTRACT

A combustible newspaper log consisting of a roll of newspapers and a metal ring extending therearound for retaining the newspapers in roll form. The roll has the folded edges at one end of the roll and has the paper free edges at the other end, for ready ignition of the roll by a match or the like. The ring is of iron material and a substantial thickness and length and it does not distort under heat and is reusable.

1 Claim, 4 Drawing Figures

COMBUSTIBLE NEWSPAPER LOG

This invention relates to a combustible newspaper log, and, more particularly, it relates to a newspaper log which is formed into a cylindrical form and retained by a metal ring.

BACKGROUND OF THE INVENTION

Rolls or cylindrical forms of newspapers used as fireplace or combustible logs are old. These commonly exist with or without some type of support or restrainer holding the newspaper in the cylindrical or rolled form. One example is shown in U.S. Pat. No. 3,186,333 where simply a rubber band is utilized for holding a roll of newspaper in the rolled form. Also, U.S. Pat. Nos. 28,753 and 199,394 show the application of banding material to a roll of various materials.

However, the prior art does not disclose the arrangement of a newspaper roll retained by means of a sturdy, non-destructive, and reusable type of ring which holds the roll in the cylindrical form and which also stabilizes the roll against tipping action. That is, the newspaper combustible roll of this invention includes a reusable ring of iron which is not destroyed nor even distorted when subjected to an extended fire, but the ring retains the newspaper in the rolled form until it is consumed by the fire. At that time, the ring can be retrieved from the fire location and it can be reused for encircling another bundle of rolled newspapers for reuse as a combustible log.

Further, the roll of newspapers of the combustible log of this invention is arranged so that the conventional folded edge of the newspaper exists only at one end of the log and the conventional free or non-folded edges of the newspaper exists only at the other end of the roll of newspaper and is therefore available for initial ignition by a match or the like in commencing the combustion of the newspaper roll.

Further, the ring portion of the newspaper combustible roll of this invention is also of sufficient weight so that it will cause the roll to bear downwardly while it is being consumed by flames of fire, and therefore the roll will burn in the manner which a normal wood log would burn, rather than have the otherwise unrestrained roll of newspaper unwrap or rise during combustion so that only the individual sheets of the newspaper would be burning separate from each other.

DETAILED DESCRIPTION OF THE PREFERRED EMBODIMENT

Figure 1:
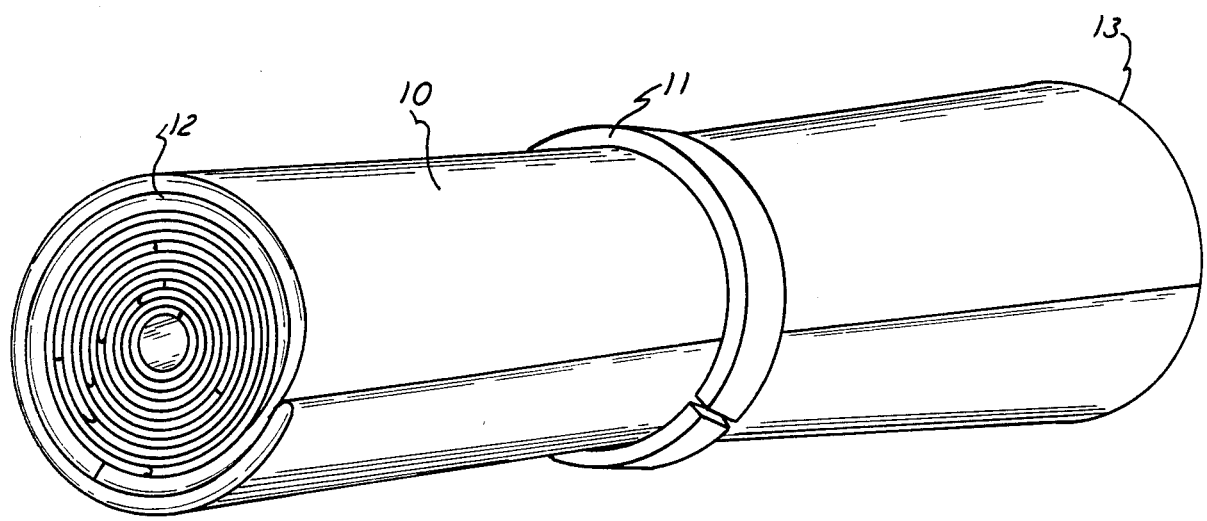
FIG. 1 is a perspective view of a combustible newspaper log of this invention.

The invention comprises the roll of newspaper 10 and the restraining ring 11 encircling the cylindrical roll 10, as shown in FIG. 1. The newspaper roll 10 is of a conventional present-day type of newspaper and it therefore has an overall length of approximately 15 inches when rolled in the orientation and configuration of that shown in FIG. 1. It will be further noticed that all of the newspaper folds 12 are at one end of the roll 10, and thus all of the free or unfolded newspaper edges 13 are at the other end and are therefore available for being ignited by a match or the like for ready burning or ignition.

Figure 2:
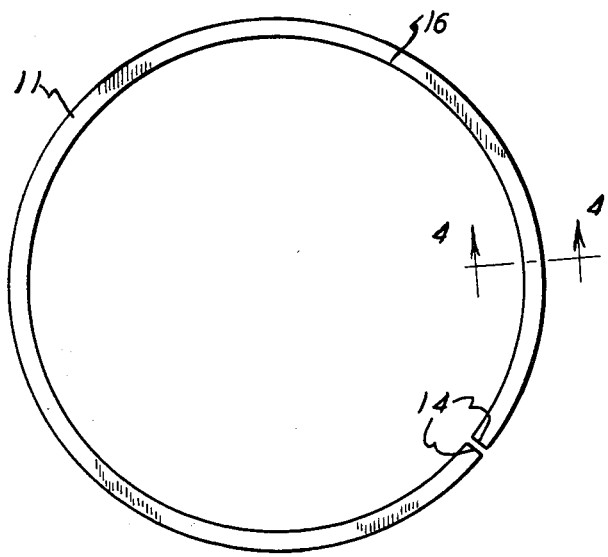
FIG. 2 is an enlarged end elevational view of the restraining ring shown in FIG. 1.

The ring 11 is made of a heavy metal material, iron material or steel being a form of iron. The ring 11 is disposed midway on the roll 10, and it has an inner diameter of 4 to 5 inches, as seen in FIG. 2. Also, FIGS. 2 and 4 show that the cross-sectional thickness of the ring 11 is substantial and is at least three-sixteenths inches thick. Finally, the ring 11 is of a length of at least one-half inch, as viewed in FIG. 3. With that arrangement of the ring 11, the ring provides the necessary several characterics to render the combined combustible roll inventive and feasible for purposes of utilizing the roll in a fireplace, stove, orthe like.

That is, the ring 11 will not distort under an extended period of exposure to fire, such as at least twenty minutes of exposure to fire formed by a plurality of the rolls 10 being burned simultaneously. The ring 11 will not be destroyed nor will it even distort in any respect, because of its iron material and because of the dimensions given herein. Further, the ring 11 has the significant length of at least one-half inch, and thus the roll 10 retains its cylindrical shape and will not tend to unroll at its opposite ends, beyond a very minimal amount, and thus the roll 10 retains its compact or tightly rolled shape so that it simulates the burning of an ordinary wood log. In contrast, if the ring 11 were not used, or if a ring were used that would be destroyed by fire or/would distort or would not securely hold the roll 10, then theroll would tend to unravel and the newspaper sheets would burn singly in a flash-flame type of combustion which is not desired in this instance.

Also, the weight of the ring 11 is substantial, due to the material and dimensions given herein, and thus the newspaper roll tends to rest downwardly, one on top of another where there are a plurality of these rolls, and again this provides for a burning virtually identical to that of burning a wood log, all as desired. Still further, when the newspaper 10 itself is consumed by fire, then the ring 11 can be retrieved and used for another newspaper log.

The ring 11 is initially of a strip of a straight or flat stock of iron, and it is rolled to the circular form shown, by having the two ends 14 move toward each other, but be slightly spaced apart, as shown in the drawings.

Figure 3:
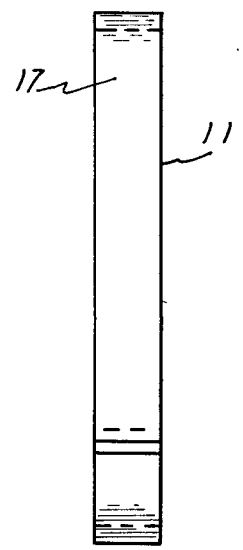
FIG. 3 is a side elevational view of FIG. 2.
Figure 4:
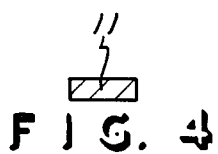
FIG. 4 is a sectional view taken on the line 4—4 of FIG. 2.

Thus, FIG. 2 shows the internal diameter of the ring 11 to be substantial, and it also shows the substantial thickness designated 16; and FIG. 3 shows the substantial ring length designated 17; and FIG. 4 shows the thickness and length in the section view, all to provide a ring of a non-destructible and reusable construction.

In actuality, two or three newspapers, such as the two sections of each daily Wall Street Journal (trademark) can be rolled into the cylindrical form shown in FIG. 1, and that cylinder 10 can then be bound by the ring 11 and retained in that tightly rolled condition for combustion, as mentioned.

What is claimed is:

1. A combustible newpaper log comprised in a cylindrical roll of newspaper with a longitudinal axis of at least 10 inches and a diameter of at least 3 inches, a length of a strip of iron metal having two free ends and being circularly shaped into a ring with said ends adjacent each other but spaced apart to form a ring of an internal diameter of at least 3 inches and a length of at least ½ inch and said strip having a cross-sectional thickness of at least 3/16 inch, said ring surrounding said roll and disposed centrally along the length of said roll for holding the newspaper in the cylindrical shape, said ring being made from flat stock iron metal and rolled into the circular shape and being non-distortable when completely surrounded by combustion simultaneously generated by a plurality of said logs for a period of at least 20 minutes.

* * * * *